Patented June 15, 1954

2,681,348

UNITED STATES PATENT OFFICE 2,681,348

LEUCO-CALCIUM PHTHALOCYANINE AND PROCESS OF MAKING THE SAME

Robert A. Brooks, Salem, N. J., assignor to E. I. du Pont de Nemours and Company, Wilmington, Del., a corporation of Delaware No Drawing. Application May 24, 1952, Serial No. 289,887

2 Claims. (Cl. 260—314.5)

This invention relates to a novel, solvent-soluble complex compound which is capable of yielding metal-free phthalocyanine upon treatment with reducing agents or upon heating.

As is well known, metal-free phthalocyanine (sometimes referred to also simply as phthalocyanine) is an intensely colored pigment of highly desirable qualities for instance as regards shade, tinctorial strength, heat stability and fastness to light. Ever since its discovery, attempts have been made to produce from it dyestuffs for textile materials. Its extreme insolubility, however, both in water and in common organic solvents, for instance alcohols, benzene or chloroform has thwarted hitherto the attempts to apply this color directly to textile fiber.

It is accordingly an object of my invention to produce a novel, solvent-soluble, complex compound which is capable of generating metal-free phthalocyanine upon reduction. The advantage of such a compound is that by virtue of its solubility in organic solvents, for instance alcohols, benzene or chloroform, it can be applied to textile fiber by the aid of such solvents, and can then be converted on the fiber into the insoluble metal-free coloring matter by treatment with reducing agents. Various additional objects and achievements of this invention will appear as the description proceeds.

Now, I have found that by treating phthalonitrile with ammonia and calcium oxide or hydroxide under conditions more fully set forth hereinbelow, a novel, complex, solvent-soluble, calcium compound is obtained which seems to be made up of 6 phthalonitrile units, an atom of calcium and an $NH_3$ group. It also seems to contain 3 molecules of water of crystallization or hydration. Without limiting this invention thereby, it is my belief that my novel compound possesses a structure which may be expressed by the empirical formula—

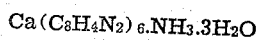

$Ca(C_8H_4N_2)_6 \cdot NH_3 \cdot 3H_2O$

My novel, complex compound is distinguished from calcium phthalocyanine first of all by deing soluble in various alcohols, benzene or chloroform. Also, whereas calcium phthalocyanine is intensely colored and produces excellent pigments, the novel complex compound is barely colored (producing in solution a yellow-greenish color) and has by itself no tinctorial properties whatever. But upon reduction with aqueous, alcoholic or aqueous-alcoholic-solutions of ascorbic acid, with or without warming, the novel complex compound decomposes, splitting out phthalonitrile, ammonia and calcium (in the form of calcium ascorbate), and producing metal-free phthalocyanine. The pigment may be separated from the regenerated phthalonitrile, by washing out the latter with a suitable solvent, for instance acetone or glycol-monoethyl ether.

The same type of decomposition with generation of pigment is obtained if the leuco compound is treated with an aqueous, alcoholic or aqueous-alcoholic solution (including in these terms alcohol-ethers such as the "Cellosolves" and "Carbitols"), of other reducing agents, for instance sodium sulfide or sodium hydrosulfite. The decomposition may also be achieved by heating alone, say to a temperature of 300° C. or higher, but because of attendant side reactions, this course is less desirable.

Because of the aforementioned lack of tinctorial properties in the complex intermediate of this invention, and because of the readiness with which it generates a pigment by treatment on the fiber, I find it convenient to refer to the novel compound as leuco-calcium phthalocyanine, by analogy to the term employed in the vat dye field, it being remembered, however, that whereas a leuco vat compound is a reduction product of the dye, the leuco-calcium phthalocyanine is in a sense a higher oxidation stage than calcium phthalocyanine, inasmuch as it yields phthalocyanine upon treatment with reducing agents.

The synthesis of my novel leuco-calcium phthalocyanine is preferably effected by reacting phthalonitrile with anhydrous ammonia and dry calcium oxide or hydroxide, at 65° to 100° C., and for 10 to 40 hours, in solvents such as methanol, ethanol or the "Cellosolves" (ethylene glycol monomethyl, monoethyl or monobutyl ether, etc.). The quantity of calcium oxide or hydroxide should, for complete reaction, be at least equal to theory, that is 1 mole of the calcium compound for each 6 moles of phthalonitrile. The ammonia is preferably passed into a mixture of lime and solvent until the latter is saturated, whereupon the phthalonitrile is added. The order of addition, however, may also be reversed, if desired. Liquid ammonia may be employed, if desired.

The reaction may be carried out in an open or sealed vessel. As reaction proceeds, most of the reactants are consumed, producing a yellow-brown reaction mass, depending on the concentration of the leuco compound produced. By filtering off any insoluble residues and drowning the filtrate in water, the leuco compound may be isolated and dried at room temperature.

Without limiting my invention, the following examples are given to illustrate my preferred mode of operation. Parts mentioned are by weight.

Example 1

Five parts of powdered calcium oxide were placed in a flask with 350 parts of dry ethylene glycol monoethyl ether. The resulting slurry was then saturated with ammonia at room temperature. Sixty-four parts of phthalonitrile were added and the mixture was heated to 90° C. and agitated at that temperature for 20 hours. Filtration at 90° C. gave a heavy filter cake which was extracted first with 1000 parts of dimethylformamide at 60° C. and then with 500 parts of dimethylformamide at the same temperature. The extracts were added to the original filtrate and the dissolved leuco calcium phthalocyanine was precipitated by drowning this composite in 10,000 grams of water. It was a weak yellow-green, granular material which was isolated by filtration, washed with water and dried.

When 1 part of the above product was reduced with 1 part of ascorbic acid in 100 parts of boiling diethylene glycol monobutyl ether, 0.64 part of essentially pure metal-free phthalocyanine was obtained.

The process may also be operated at temperatures below 90° C., with an increase in reaction time. At 70° C., for example, 40 hours should be allowed for the reaction. Above 90° C., the process may be operated with a decrease in reaction time. At 100° C., for example, 10 hours are enough for the reaction. Above 100° C., decomposition of the product decreases the yields considerably. Below 65° C., the reaction rate is very low and the process cannot be operated economically.

In lieu of ethylene glycol monoethyl ether in the above example, the corresponding monomethyl ether may be employed. Anhydrous methyl and ethyl alcohols work also, but the results are not so good as with the ether-alcohols named.

Example 2

Three parts of powdered calcium oxide and 34 parts of phthalonitrile were heated at 90° C. for 20 hours in 250 parts of ethylene glycol monoethyl ether. The reaction mixture was filtered and the filter cake was extracted with 500 parts of dimethylformamide at 60° C. The extracts were added to the original filtrate and the dissolved leuco calcium phthalocyanine was precipitated by drowning this mixture in 8,000 parts of water. After isolation by filtration the product was washed with water and dried. When 1 part of this product was reduced with 1 part of ascorbic acid in 100 parts of boiling diethylene glycol monobutyl ether, 0.55 part of metal-free phthalocyanine was obtained.

In this procedure the ammonia necessary for reaction is believed to come from alcoholysis of a portion of the phthalonitrile. Such consumption, however, of phthalonitrile to produce ammonia is reflected in a lowered yield of the desired product.

It will be understood that the details of procedure may be varied within the skill of those engaged in this art, without departing from the spirit of this invention.

The novel compounds of this invention may be used for dyeing or printing textile fibers, particularly cotton and rayon, by conventional padding or printing processes, followed by reduction of the color on the fiber by the aid of aqueous or aqueous-alcoholic solutions of reducing agents commonly employed in textile treatments, for instance sodium sulfide or sodium hydrosulfite, whereby to develop the fast, greenish-blue color of metal-free phthalocyanine upon the fiber.

I claim as my invention:

1. The alcohol-soluble complex compound obtained by reacting, in an alcoholic solvent and at a temperature between 65° and 100° C., phthalonitrile, ammonia and a calcium compound of the group consisting of calcium oxide and hydroxide, said complex compound being characterized by yielding metal-free phthalocyanine upon reduction with ascorbic acid.

2. A process for producing an intermediate complex compound adapted to yield metal-free phthalocyanine upon being treated with reducing agents, which comprises reacting 6 moles of phthalonitrile with not less than 1 mole of ammonia and not less than 1 mole of a calcium compound of the group consisting of calcium oxide and hydroxide, in an alcoholic solvent at a temperature not exceeding 100° C., then removing any residual insoluble material and drowning the clear reaction mass in water.

No references cited.